Dec. 30, 1930.  C. H. HAPGOOD  1,787,152
COW MILKING APPARATUS
Filed March 17, 1928  4 Sheets-Sheet 2

WITNESS:

INVENTOR
Cyrus Howard Hapgood
BY
ATTORNEYS.

Dec. 30, 1930.  C. H. HAPGOOD  1,787,152
COW MILKING APPARATUS
Filed March 17, 1928   4 Sheets-Sheet 3
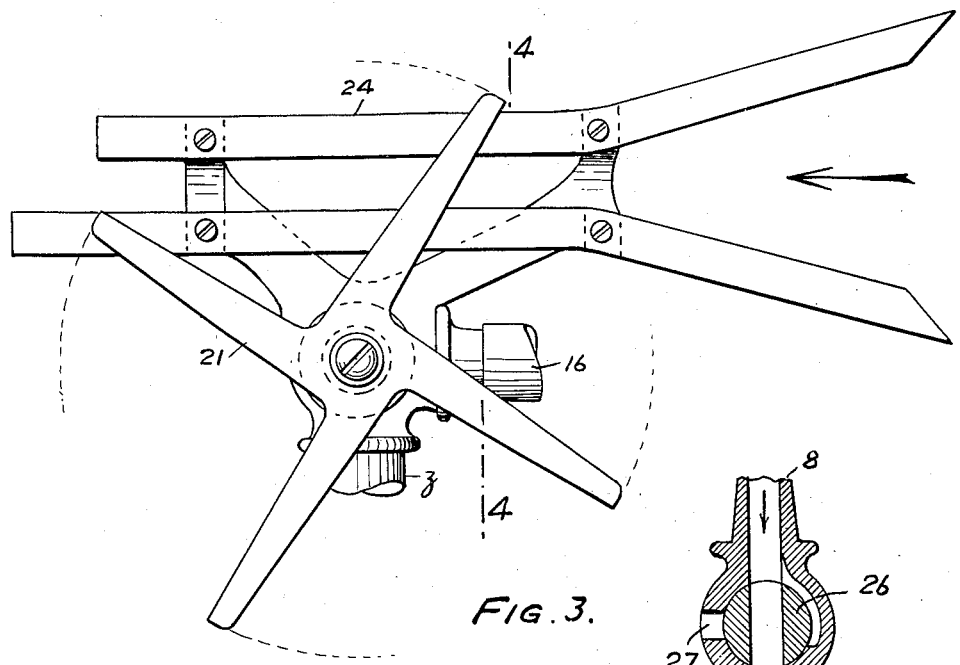
FIG. 3.
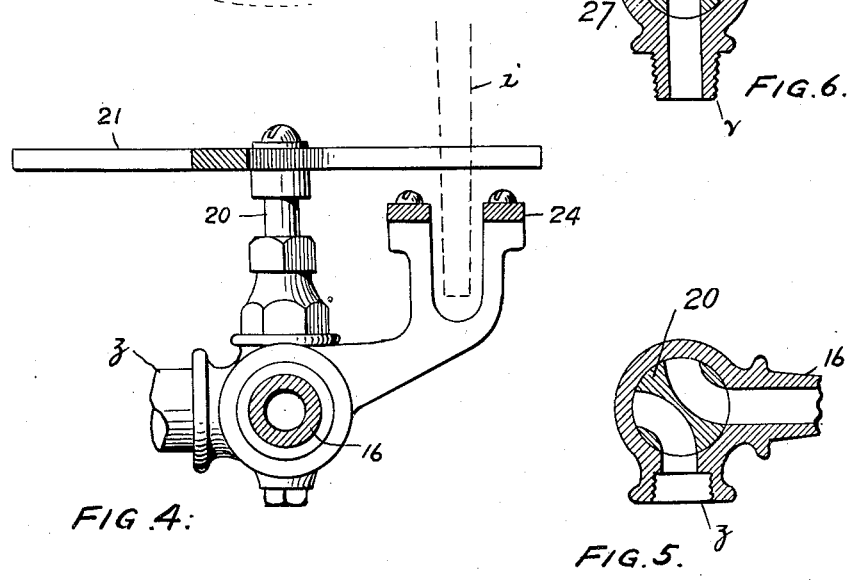
FIG. 4.
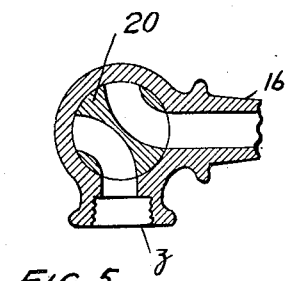
FIG. 6.
FIG. 5.
WITNESS:
Rob P Kitchel.
INVENTOR
Cyrus Howard Hapgood
BY
Busser and Harding
ATTORNEYS.

Dec. 30, 1930.  C. H. HAPGOOD  1,787,152
COW MILKING APPARATUS
Filed March 17, 1928   4 Sheets-Sheet 4

INVENTOR
Cyrus Howard Hapgood
BY
Busser and Harding
ATTORNEYS.

WITNESS:

Patented Dec. 30, 1930

1,787,152

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

COW-MILKING APPARATUS

Application filed March 17, 1928. Serial No. 262,337.

The object of this invention is to provide an apparatus whereby an indefinitely large number of cows may be milked successively and largely automatically and whereby after the conclusion of the milking operation, the milk from each cow may be discharged and weighed and the corresponding milking unit thoroughly and automatically cleaned preparatory to its application to another cow.

A preferred embodiment of the invention is shown in the drawings, in which—

Fig. 3 is an enlarged plan view of the mechanism for automatically operating one of a number of cocks controlling the flow of air and milk through a milking unit.

Fig. 4 is an elevation, partly in section, of the mechanism shown in Fig. 3.

Fig. 5 is a sectional view of the valve controlling air pulsations to the claw pulsator.

Fig. 6 is a sectional view of the valve controlling the connection of the milk pail with vacuum or atmosphere.

A turntable or turnable platform $a$, which is of annular shape and which may be located at or above ground level, is mounted to turn on supports positioned a suitable distance beneath the table. It is preferred to dig a suitable annular channel and on the floor thereof support holders carrying two concentric rows of spaced-apart wheels $b$; and to provide the turntable with two circular concentric beams carrying tracks $c$ resting on the rollers $b$.

Figure 1:
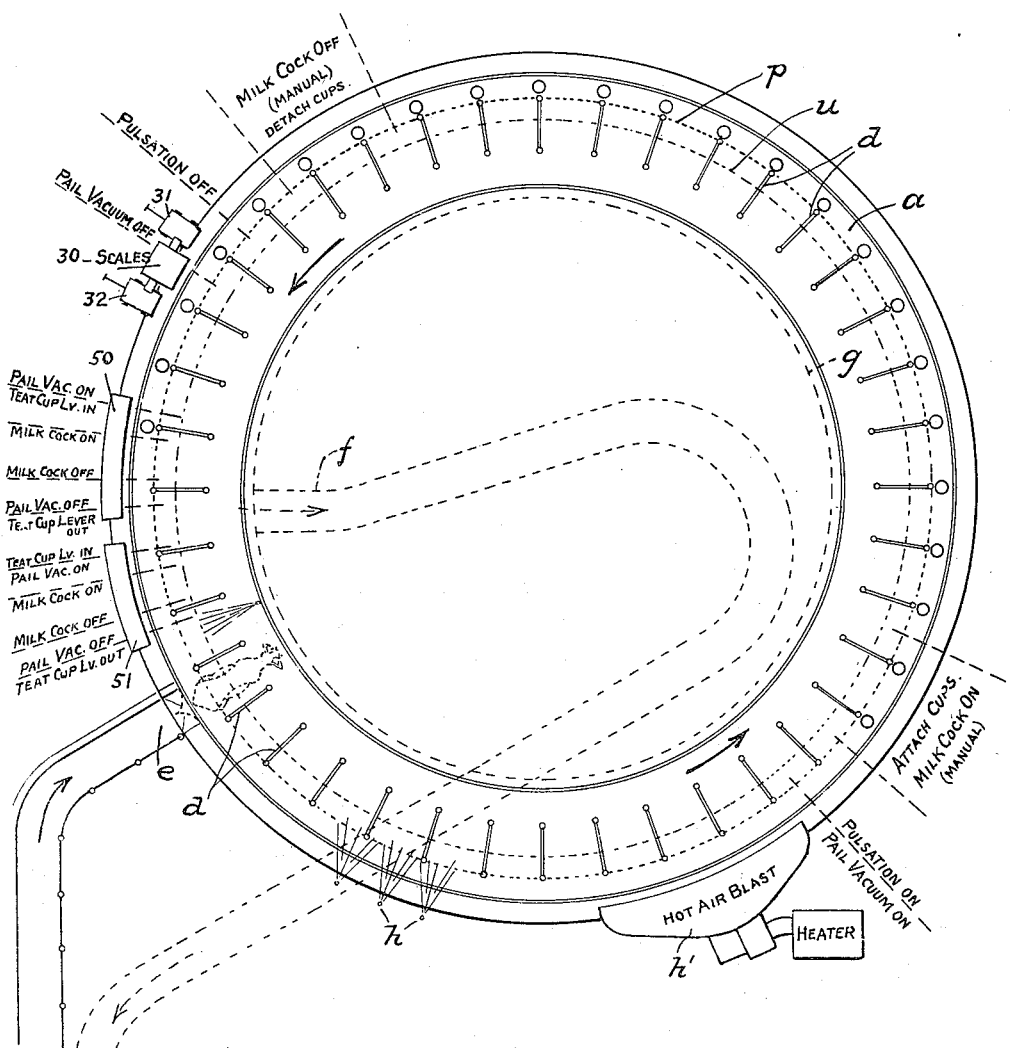
Fig. 1 is a plan view of a complete plant omitting most of the details of construction, but illustrating diagrammatically the succession of operations.

By means of suitable radial partitions $d$, which may comprise upright bars connected by horizontal bars (Figs. 1 and 2) the turntable is divided into radial stalls each of a width adapted to conveniently accommodate a single cow.

In operation, the table is continuously and slowly rotated and during such rotation the cows walk onto the table, one by one, into successive stalls. It is advisable to provide a suitable admission walk-way $e$, enclosed at the sides, into which the cows are driven and along which they walk, one by one, and from which they walk, one by one, into successive stalls as the latter successively come into register with the walk-way.

During the rotation of the turntable the cows are successively milked and other operations are performed, all as hereinafter described.

Another walk-way $f$, is provided onto which the cows walk from successive stalls after they have been milked. This exit walk-way may preferably extend from the inner edge of the table, so as to allow the cows to walk forward and not compel them to back off. The walk-way comprises a tunnel section extending under the table, an inclined approaching section within the circle of the table and an inclined departing section outside the table.

The space within the circle may be left open, or it may be occupied by a raised drum-like enclosure $g$.

Spraying devices $h$ and a hot air blast $h^1$ may be arranged, outside the table circle, to enable the cow udders to be preliminarily washed and dried as the cows are carried along, in the rotation of the table, forward to the locus of milking.

The primary elements of the milking machine, namely, a vacuum pump $n$, a motor $m$ and a master or primary pneumatic pulsator $q$, may be supported beneath the table $a$. The milking machine employed may be a pneumatic system such as is set forth in the Forsyth Patent No. 1,257,688, or a pneumatic electric system such as is set forth in the Daysh and Hapgood Patent No. 1,405,104, or any other suitable system. For convenience, the present invention is shown as adapted to the Forsyth system. Other elements of the selected milking machine will be hereinafter described.

A number of stationary L-shaped frames $o$, each of which may comprise an upright rod extending outside the table and a lateral rod extending over the table and connecting the upright rod with the central structure g, are arranged at different points around the table. Each frame o carries one or more depending actuators i, j and k, which are suitably positioned, at different circumferential points, to actuate various cocks or valves, at suitable times, as hereinafter described.

Figure 2:
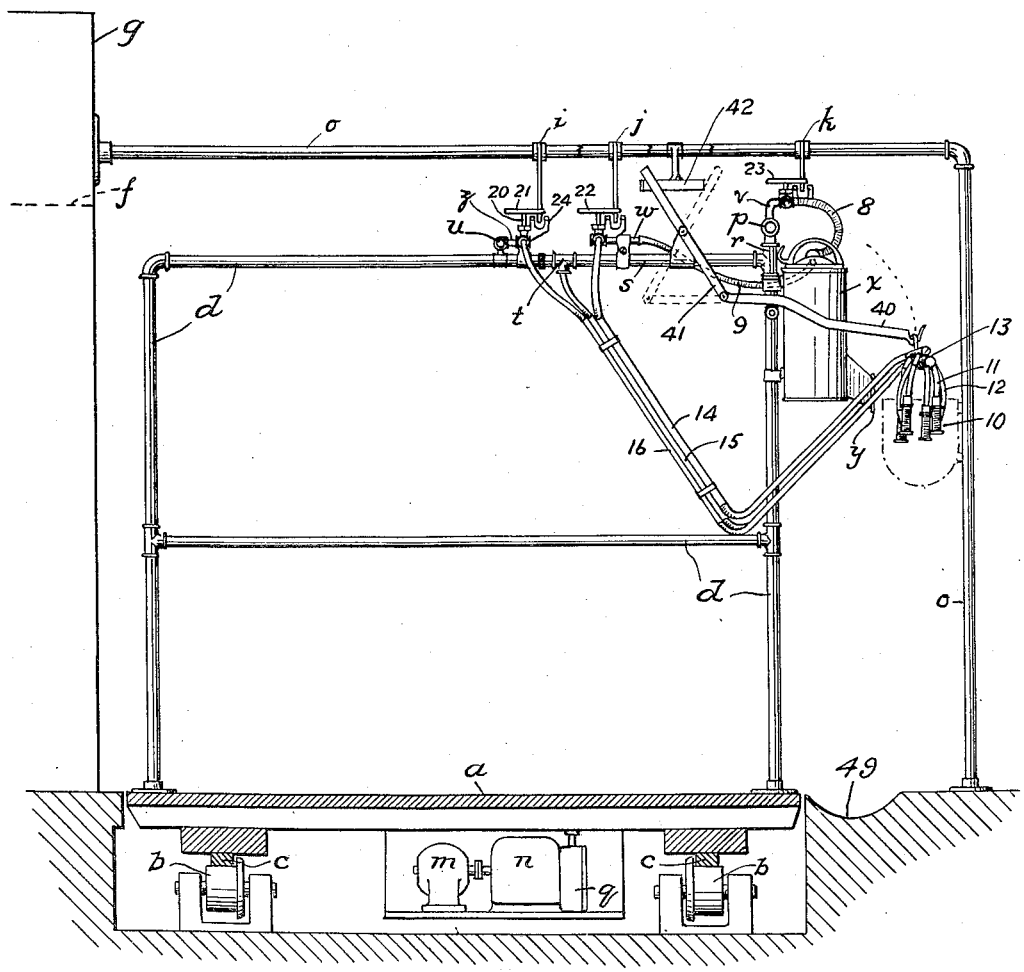
Fig. 2 is a sectional view through the rotary table for receiving and carrying the cows while they are being milked.

Supported on frames d and extending around and concentric with the table is a vacuum pipe p, which is connected with the vacuum pump n. This pipe communicates at each stall, with a T coupler r and through a tube s with another T coupler t. The said couplers and tube may form a part of the frames d, as shown in Fig. 2.

Also supported on frames d and extending around and concentric with pipe p is a pulsation pipe u, which is connected with the primary pneumatic pulsator q, which connects pipe u alternately with atmosphere and vacuum and thereby produces therein pneumatic pulsations. At each stall, pipe u is provided with a branch pipe or nozzle z.

Also supported on each frame d is a short transversely extending milk pipe w.

At each stall is also supported, from vacuum pipe p, a short pipe v communicating therewith.

Milk pails x are adapted to be removably hung on the frames d. Each pail x is provided with a discharge funnel at the outlet end of which is pivotally hung a gate y, which is adapted to be held down by atmospheric pressure when vacuum is on the pail and is adapted to swing open and release contained milk when the vacuum on the pail is released. The milk pail carries a hose 8, which is adapted for connection with the corresponding vacuum pipe v and a hose 9 adapted to be connected with the corresponding milk pipe w.

Each teat cup of a set of double chamber teat cups 10 is connected, by means of a milk pipe 11 and a pulsation pipe 12, with a claw 13, which carries a secondary pneumatic pulsator preferably like or similar to that set forth in the Leitch Patent No. 1,255,186, and a milk chamber. From claw 13 extends a milk pipe 14 (communicating through the milk chamber of claw 13 with the inner chambers of the teat cups), a vacuum pipe 15 and a pulsation pipe 16.

Milk pipe 14 is adapted for connection with any one of the milk pipes w and thence, through hose 9, with the milk pail x. Vacuum pipe 15 is adapted for connection with a coupler t and thence, through the corresponding tube s and coupler r, with the vacuum pipe p. Pulsation pipe 16 is adapted for connection with any one of the branches z of pipe u and thence, through pipe u, with the primary pulsator q.

Each pulsation pipe z is provided with a valve 20 (see Figs. 4 and 5) the stem of which extends through and above pipe z and carries a four-armed wheel 21. In the rotation of the table, one of the arms, at a predetermined time, engages actuator i and is thereby turned, in the direction shown by the arrow, Fig. 3, thereby opening valve 20, whereupon pneumatic pulsations are transmitted to the claw pulsator.

Each milk pipe w is provided with a valve, which may be similar to that shown in Fig. 5, carrying a wheel 22 similar to wheel 21. In the rotation of the table, one of the arms of the wheel, at a predetermined time, engages actuator j and is thereby turned to open this milk valve to allow cleansing fluid to flow, from the inner teat cup chambers, through the milk chamber of the claw 13, pipe 14, pipe w and hose 9 to the milk pail. Just before attaching teat cups 10 to the cow and just before removing them from the cow this milk valve is operated manually.

Each vacuum pipe v is provided with a valve 26 (see Fig. 6) carrying a wheel 23, similar to wheels 21 and 22. In the rotation of the table, one of the arms of the wheel, at a predetermined time, engages actuator k and is thereby turned to open this vacuum valve (which has been connected with atmosphere through port 27) to connect the milk pail, through hose 8 and pipe v, with the main vacuum line p.

In order to insure the proper operation of the valves controlled by wheels 21, 22 and 23, there is carried along with each gate a cam guide 24, shown in detail in Figs. 3 and 4, comprising two spaced apart bars diverging in front to insure the engagement therewith of the corresponding actuator i, j or k. In Fig. 4 the guide associated with wheel 21 is shown, this guide being conveniently supported on the nozzle z.

Before describing the operation of the apparatus, it may be well to describe the way in which an ordinary milking machine of the double chamber teat cup type described, is applied to the cow preparatory to, and following, the milking operation. The operator first inverts the teat cups so as to kink the milk tubes and prevent passage of air therethrough. A valve is then operated to connect the pulsation tube from the claw with the pneumatic pulsation line. Another valve is then operated to connect the pail and the milk tube from the claw with the vacuum line. The cups are then turned upright one by one and applied to the teats. Thus is prevented the breaking down of the vacuum which would result if air were sucked through all the cups simultaneously. After the milking operation, the vacuum valve is closed, the cups are removed from the teats, and the pulsation valve is closed. An understanding of this mode of operation will be helpful in understanding the operation of the present apparatus.

In describing the operation of the present apparatus, it may be convenient to follow the progress of a particular cow and the milking and other operations there are performed as the cow is carried around. While the cow is being cleaned, as hereinbefore described, the teat cups intended for application to this particular cow are, through pipes 14, 15 and 16, connected respectively with the milk pipe w, coupler t communicating with vacuum, and nozzle z, of the corresponding stall frame d. The pail intended for the reception of milk from such cow is suspended from the frame d, as shown in Fig. 2. After the cow is cleaned, one of the specified frames d reaches a point at which wheels 21 and 23 contact with actuators i and k, which turn the wheels a quarter revolution and open the valves respectively controlling the connection between pulsation pipe u and pipe 16 and the connection between vacuum pipe p and hose 8. The operator then manually turns wheel 22 a quarter revolution and opens the valve controlling the connection from milk pipe 14, through pipe w and hose 9, to the pail, after which the operator attaches the teat cups, one by one, to the cow.

Milking now proceeds and continues until the cow has been milked. Wheel 22 is then turned by hand to close the valve controlling the connection from milk pipe 14, through hose 9, to the pail. The cups are then manually detached from the cow.

A little further along, wheel 21 engages another fixed actuator i, which turns this wheel another quarter turn and closes the valve controlling the connection between pipe 16 and pulsation pipe u.

A little further along, wheel 23 engages another fixed actuator k, which gives this wheel another quarter turn and turns valve 26 to cut off communication between the main vacuum pipe p and the pail x, and connect the pail with the atmosphere. Thereupon, gate y swings open and releases the milk, which flows into a tank 60 mounted on scales 30, which weighs the milk. As soon as the weight is noted, the milk is allowed to run into a receiver 31 or 32. Two receivers are provided so that after one is filled, and while it is being removed, emptied and replaced, the milk can be run into the other receiver.

After the teat cups are detached, as above explained, they are hung on a hook at one end of a lever 40, which, near its hooked end, slidably rests on a support on the frame d, at its other end, is connected with a lever 41, pivotally supported on frame d. At the time that the teat cups are detached from the cow and hung on lever 40, lever 41 occupies the position indicated on dotted lines in Fig. 2, and the lever 40 is drawn so far to the left of the position shown in Fig. 2, and lever 41 is in such position, that the suspended teat cups are substantially above and to the left of the position shown in Fig. 2. At a suitable point beyond the point where the milk is discharged from the pail, lever 41 contacts with a cam bar 42 on one of the fixed frames o and is thereby moved into the full line position shown in Fig. 2, which drops the teat cups down into a cold water tank 50. At the same time another fixed actuator k turns wheel 23 to close the connection between the milk pail and atmosphere and open the connections between the vacuum line p and the milk pair x. Another fixed actuator j then turns wheel 22 and opens the connection between the milk line 14 from the teat cups and pipe w, thereby causing cold water to be drawn by the vacuum through the teat cups and milk pipe 14, pipe w and hose 9 to the pail, thus thoroughly flushing out, with cold water, the teat cups, the milk tubes and the milk pail. After sufficient cold water has been drawn into the milk pail, another fixed actuator j then turns wheel 22 and closes the connection between the milk pipe 14 and pipe w.

Another fixed actuator k then turns wheel 23 and closes communication between the vacuum line and the milk pail and opens communication from the atmosphere to the pail. This breaks the vacuum in the pail and allows the cold cleansing water to dump through valve y to the gutter 49 surrounding the rotary table. Another cam bar 42 at the same time engages lever 41 and moves it into the dotted line position shown in Fig. 2, thereby lifting the teat cups out of the tank 50 and moving them inward over the rotary platform.

A little further along, the same series of operations as those described for flushing out the milking unit with cold water is repeated in order to flush out the milking unit with hot water in tank 51.

Other cleansing or sterilizing solutions may be used in place of the hot water.

During the rotation of the platform, the cow whose progress we have been following is brought opposite the walkway f, which may be located at any convenient point beyond the point at which the milking operation is completed, and the cow is guided off the table into the walk-way f.

The discharge of milk from the pail x into a weigh tank 60 has been mentioned. The time permitted for the discharge of the milk into the weigh tank, weighing of the milk, and its discharge into the receiver 31 or 32 is not over about 20 seconds, and therefore it is necessary to device special quick acting devices, which should also guard against undue exposure of the milk to the air during the described operation. Such a quick operating mechanism is shown in Figs. 7 and 8.

The tank 60, which is mounted on any suitable known quick acting weighing scales, carries two quick acting valves 61 and 62, by means of which the milk, when weighed, may be quickly dumped into receiver 31 or 32. Carried by tank 60 is a conduit 63 having flanges 64, 64 engaging the top wall of the tank and swung about a center 65. The upper or free end of conduit 63 carries a drip shelf 66. Near its lower or pivoted end the conduit carries an arm 67 which is normally held against a stud 68 by means of a spring 69.

Figure 7:
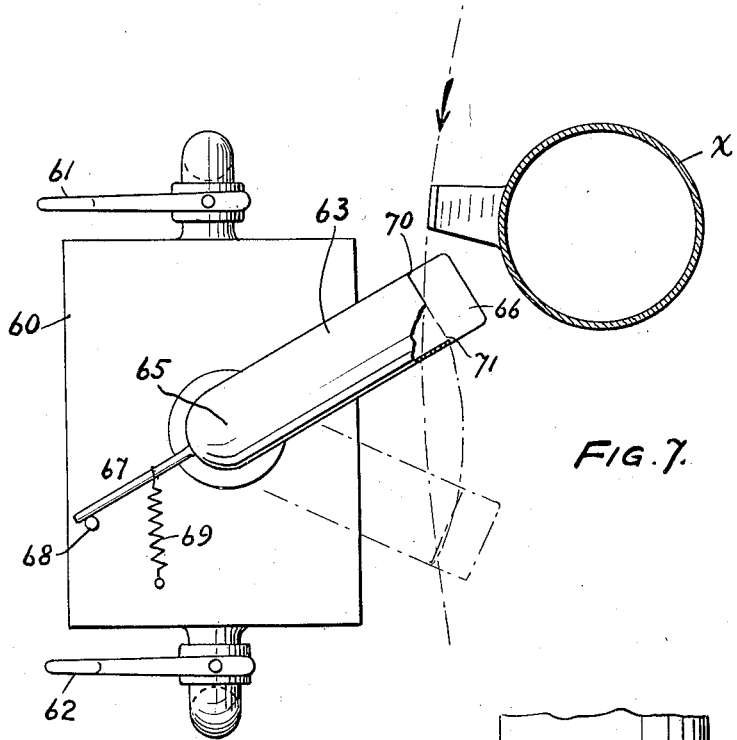
Fig. 7 is a plan view, and Fig. 8 a side view, of the weighing tank and devices associated therewith.
Figure 8:
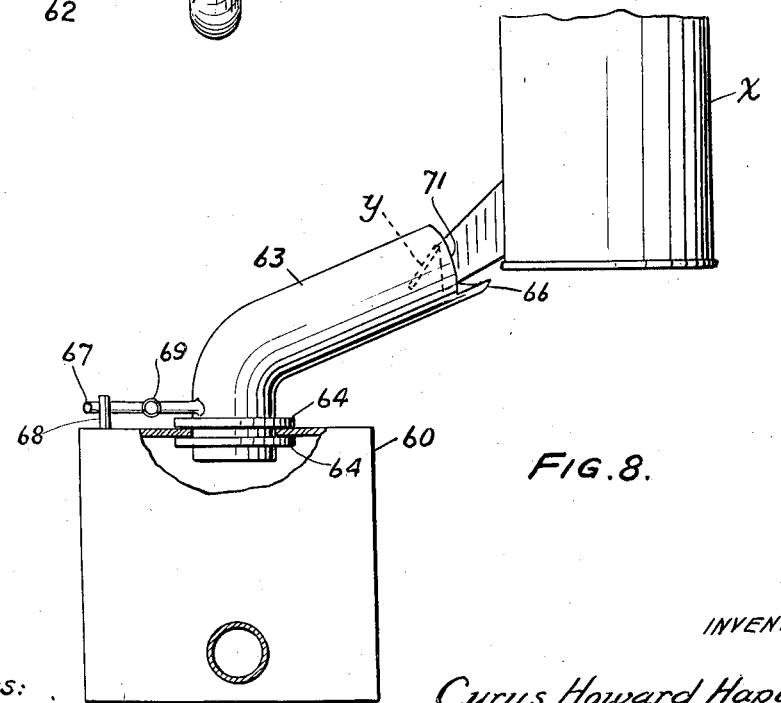

Milk pail $x$ moves in the direction indicated by the arrow in Fig. 7. Its discharge spout clears the front edge 70 of the conduit but further on engages the opposite edge 71 of the conduit and thereby swings the conduit from the full line position to the broken line position shown in Fig. 7, at which position of the conduit the spout slips off the edge 71 of the conduit, and the spring 69 returns the conduit to its original position.

During the described engagement of the spout and conduit, the gate of the pail swings open, as heretofore described, and transfers the milk through the conduit to the tank 60.

Where, in the claims, reference is made to the connection of the milk pail with atmosphere, it will be understood that any source of absolute pressure higher than that in the vacuum line is the equivalent of atmospheric pressure.

By means of the apparatus herein set forth, the milking of one cow may be started very soon after the milking of the next preceding cow has started, so that, at any given time, a considerable number of cows are being milked simultaneously. The only manual operations required are the opening of the milk cock at the beginning of the milking operation, the application of the teat cups to the cow, the closure of the milk cock at the conclusion of the milking operation, and the removal of the teat cups from the cow. The saving of labor over that required to milk an even number of cows by means of the most efficient known milking apparatus applied to cows in a barn, is pronounced. Moreover, the apparatus possesses an economy and efficiency characteristic of those manufacturing operations in which, in the fabrication of an article, a continuous succession of mechanical operations are successively performed in a certain order and at a given speed, while, at any given time, different partly completed articles are simultaneously subjected to different operations and are in different stages of completion.

The disclosure of my invention herein set forth involves, also, a disclosure of novel subject matter not my invention and which forms the subject matter of separate application filed by Kraemer Luks, March 17, 1928, Serial No. 262,389.

Having now fully described my invention, what I claim and desire to protect by Letters Patent is:

1. Apparatus of the character described comprising a movable platform adapted to carry cows to be successively milked, milking machinery comprising a number of milking units on the platform adapted to be operatively connected with a corresponding number of cows, and means made effective by the movement of the platform to render said milking units successively operable.

2. Apparatus of the character described comprising a movable platform adapted to successively receive and discharge cows and to accommodate, at any given time, a substantial number of cows, milking units on the platform adapted to be successively operatively connected with said cows and to be in such operative connection with a number of said cows simultaneously, and means made effective by the movement of the platform to render said milking units successively operable.

3. Apparatus of the character described comprising a movable platform adapted to carry cows to be successively milked, milking machinery comprising a number of milking units on the platform adapted to be operatively connected with a corresponding number of cows, and means made effective by the movement of the platform to render said milking units succesively operable until a substantial number of units are simultaneously in operation and to render the same units successively inoperable.

4. In a cow milking machine, the combination with a rotatable platform adapted to carry cows to be milked while the platform is rotating, of milking mechanism moving with said platform and comprising sets of teat cups, milk receivers, air conduits and milk conduits adapted to cooperate to start the milking of cows successively and to convey their milk to the receivers, and devices respectively movable with the platform and relatively stationary adapted to cooperate to control the operation of said milking mechanism.

5. Apparatus of the character described comprising a movable platform having an elongated floor space along which a number of cows are adapted to be disposed; milking machinery comprising a primary operating mechanism, milking machine units arranged along the platform and connections between said primary operating mechanism and said milking machine units, all movable with the platform; and means actuatable in the movement of the platform to render said units actuatable by said primary operating mechanism.

6. In a cow milking machine, the combination with a movable platform having an elongated floor space along which a number of cows are adapted to be disposed; milking machinery comprising a vacuum pump, a vacuum pipe and a series of milking machine units arranged along the platform, all movable with the platform; and means operable in the movement of the platform and controlling the connection between the vacuum pipe and the milking machine units.

7. In a cow milking machine, the combination with a movable platform having an elongated floor space along which a number of cows are adapted to be disposed; milking machinery comprising a series of sets of teat cups disposed along the platform and means to produce pneumatic pulsations in the teat cups, both movable with the platform; and means operable in the movement of the platform and controlling the connection between the pneumatic pulsation means and the sets of teat cups.

8. Apparatus of the character described comprising a movable platform having an elongated floor space along which a number of cows are adapted to be disposed, milking machinery comprising a series of milking machine units arranged along the platform, manually contolled means and automatic means adapted to cooperate to render said milking units operative and devices adjacent the platform adapted to render said automatic means operative.

9. In a cow milking machine, the combination with a movable platform having an elongated floor space along which a number of cows are adapted to be disposed; of milking machinery comprising a vacuum pipe, sets of teat cups and milk receivers arranged along the platform, and means to effect pneumatic pulsations in said teat cups; manually controlled means adapted to connect the sets of teat cups with the milk receivers, and means operable in the movement of the platform to connect said milk receivers successively with said vacuum pipe and to render the sets of teat cups successively operative by said pneumatic pulsation means.

10. In a cow milking machine, the combination with a movable platform having an elongated floor space along which a number of cows are adapted to be disposed; of milking machinery comprising a vacuum pipe, sets of teat cups and milk receivers, and means to effect pneumatic pulsations of said teat cups; manually controlled means to connect and disconnect sets of teat cups with the milk receivers, and means operable in the movement of the platform to connect said milk receivers successively with said vacuum pipe and subsequently successively disconnect them therefrom and to render the sets of teat cups successively operative by said pneumatic pulsation means and subsequently render them successively inoperative thereby.

11. In a cow milking machine, the combination with a movable platform adapted to carry cows to be milked while the platform is moving, of milking machinery, including milk receivers adapted to receive the milk, carried by said platform and relatively stationary devices adjacent the platform adapted to control the discharge of milk from said receivers.

12. In an apparatus of the character described, the combination with a movable platform, of milking machinery, including milk conduits, carried by the platform, means carried by the platform to produce a flow of cleaning fluid through said conduits, and relatively stationary devices adjacent the platform adapted to render said means operative.

13. In a cow milking machine, the combination with a movable platform adapted to carry cows to be milked, of milking machinery, including milk conduits and receivers, carried by the platform, and devices movable with the platform and other relatively fixed devices adapted to cooperate with the movable devices to render said milking machine operative and inoperative, discharge the milk from the receivers and wash the milk conduits and receivers.

14. In a cow milking machine, the combination with a movable platform adapted to carry cows to be milked, of milking machinery comprising primary operating mechanism and a series of spaced apart milking units arranged along the platform, means movable with the platform adapted to render each of said units operative by said primary operating mechanism, and relatively fixed devices adapted to cooperate with said means to render said units successively operative as the units pass a given point in the rotation of the platform.

15. In a cow milking machine, the combination with a movable platform adapted to carry cows to be milked, of milking machinery comprising primary operating mechanism and a series of spaced apart milking units arranged along the platform, means movable with the platform adapted to render each of said units operative and inoperative by said primary operating mechanism, and relatively fixed devices adapted to cooperate with said means to render said units successively operative and successively inoperative by said primary operating mechanism.

16. In a cow milking machine, the combination with a movable platform adapted to carry cows to be milked, of milking machinery comprising a series of spaced apart milking units arranged along the platform, and means to render said units successively operative and successively inoperative while maintaining at any given time a number of said units simultaneously in operation, said means comprising devices carried by the platform and cooperating and relatively stationary devices positioned at different points along the line of travel of the platform.

17. In a cow milking machine, the combination with a rotatable platform adapted to carry cows to be milked while the platform is rotating, of milking mechanism extending around and turnable with said platform, sets of teat cups connected with said milking mechanism at spaced intervals along its length, devices moving with said platform and milking mechanism and adapted to control operative communication between said milking mechanism and the respective teat cup sets, and relatively fixed actuators adapted, in the rotation of the platform, to actuate said devices.

18. In a cow milking machine, the combination with a rotatable platform adapted to carry cows to be milked while the platform is rotating, of a vacuum pipe turnable with said platform, sets of teat cups and milk conduits connected respectively therewith and turnable with said platform, milk receiving means connected with said conduits, air conduits from the milk receiving means, and valves arranged at spaced intervals along the length of said vacuum pipe and controlling communication between said vacuum pipe and the respective air conduits.

19. In a cow milking machine, the combination with a rotatable platform adapted to carry cows to be milked while the platform is rotating, of milking mechanism extending around and turnable with said platform, sets of teat cups connected with said milking mechanism at spaced intervals along its length, devices moving with said milking mechanism and adapted to control operative communication between said milking mechanism and the respective teat cup sets, one of said devices comprising a turnable member provided with radial arms, a relatively fixed actuator adapted, in the rotation of the platform, to engage and move one of said arms, and thereby turn said member, and a cam-guide moving with said turnable member adapted to insure proper engagement therewith of the actuator.

20. In a cow milking machine, the combination with a rotatable platform adapted to carry cows to be milked while the platform is rotating, of a vacuum pipe turnable with said platform, sets of teat cups and milk conduits connected respectively therewith and turnable with said platform, milk receiving means connected with said conduits, air conduits from the milk receiving means, valves arranged at spaced intervals along the length of said vacuum pipe and controlling communication between said vacuum pipe and the respective air conduits, manually operable valves controlling the milk conduits and relatively fixed actuators adapted, in the rotation of the platform, to respectively successively open and successively close the first named valves.

21. In a cow milking machine, the combination with a rotatable platform adapted to carry cows to be milked while the platform is rotating, of a vacuum pipe turnable with said platform, sets of teat cups and milk conduits therefrom turnable with the platform, milk receiving means connected with said conduits, means to connect the milk receiving means with said vacuum pipe and valves interposed in the respective milk conduits and controlling the flow of milk from the respective teat cup sets to the milk receiving means.

22. In a cow milking machine, the combination with a rotatable platform adapted to carry cows to be milked while the platform is rotating, of a vacuum pipe turnable with said platform, sets of teat cups and milk conduits therefrom turnable with the platform, milk pails connected with the respective milk conduits, air conduits connecting the respective pails with the vacuum pipe, valves controlling communication between the vacuum pipe and the respective air conduits, valves interposed in the respective milk conduits and controlling the flow of milk from the respective teat cup sets to the respective pails, and a relatively fixed actuator adapted in the rotation of said platform to successively operate said air conduit controlling valves.

23. In a cow milking machine, the combination with a rotatable platform adapted to carry cows to be milked while the platform is rotating, of a vacuum pipe turnable with said platform, sets of teat cups and milk conduits connected respectively therewith and turnable with said platform, milk receiving means connected with said conduits, air conduits from the milk receiving means, valves arranged at spaced intervals along the length of said vacuum pipe and controlling communication between said vacuum pipe and the respective air conduits, and valves interposed in the respective milk conduits and controlling the flow of milk from the respective teat cup sets to the milk receiving means.

24. In a cow milking machine, the combination with a rotatable platform adapted to carry cows to be milked while the platform is rotating, of a vacuum pipe turnable with said platform, sets of teat cups and milk conduits connected respectively therewith and turnable with said platform, milk receiving means connected with said conduits, air conduits from the milk receiving means, valves arranged at spaced intervals along the length of said vacuum pipe and movable to connect the respective air conduits with the vacuum pipe or atmosphere, valves interposed in the respective milk conduits and controlling the flow of milk from the respective teat cup sets to the milk receiving means, a relatively fixed actuator adapted in the rotation of the platform, to successively operate the first named valves to connect the corresponding air conduits with the vacuum pipe, and a relatively fixed actuator adapted in the rotation of the platform, to successively operate the first named valves to connect the corresponding air conduits with atmosphere.

25. In a cow milking machine, the combination with a rotatable platform adapted to receive cows to be milked while the platform is rotating, of a vacuum pipe extending around and turnable with said platform, sets of teat cups, milk conduits therefrom, means providing communication between said milk conduits and said vacuum pipe, means to pulsate the sets of teat cups, said pulsation means including controlling devices corresponding to the sets of teat cups and arranged at spaced intervals along and turnable with said platform, and a relatively fixed actuator adapted, in the rotation of the platform, to successively operate said pulsation controlling devices.

26. In a cow milking machine, the combination with a rotatable platform adapted to carry cows to be milked while the platform is rotating, of a vacuum pipe turnable with said platform, sets of teat cups and milk conduits therefrom turnable with the platform, milk receiving means connected with said conduits, means to connect the milk receiving means alternately with said vacuum pipe and atmosphere, valves interposed in the respective milk conduits and controlling the flow of milk from the respective teat cup sets to the milk receiving means, and means to pulsate said sets of teat cups, said pulsation means including devices arranged at spaced intervals along said platform.

27. In a cow milking machine, the combination with a rotatable platform adapted to carry cows to be milked while the platform is rotating, of a vacuum pipe turnable with said platform, sets of teat cups and milk conduits therefrom turnable with the platform, milk receiving means connected with said milk conduits, means to connect the milk receiving means with the vacuum pipe, valves interposed in the respective milk conduits and controlling the flow of milk from the respective teat cup sets to the milk receiving means, and means to pulsate said sets of teat cups, said means including pulsation-controlling devices arranged at spaced intervals along said platform.

28. In a cow milking machine, the combination with a rotatable platform adapted to carry cows to be milked while the platform is rotating, of a vacuum pipe turnable with said platform, sets of teat cups and milk conduits therefrom turnable with the platform, milk receiving means connected with said milk conduits, means to connect the milk receiving means with the vacuum pipe and atmosphere alternately, manually operable valves interposed in the respective milk conduits and controlling the flow of milk from the respective teat cup sets to the milk receiving means, means to pulsate said sets of teat cups, said means including pulsation-controlling devices arranged at spaced intervals along and turnable with said platform, and a relatively fixed actuator adapted, in the rotation of said platform, to successively actuate said pulsation-controlling devices.

29. In a cow milking machine, the combination with a rotatable platform adapted to carry cows to be milked while the platform is rotating, of a vacuum pipe turnable with said platform, sets of teat cups and milk conduits therefrom turnable with the platform, means adapted to connect the vacuum pipe with the respective milk conduits, valves controlling the last named connection, valves interposed in the milk conduits, and means to pulsate said sets of teat cups, said means including pulsation-controlling devices arranged at spaced intervals along the platform.

30. In a cow milking machine, the combination with a rotatable platform adapted to carry cows to be milked while the platform is rotating, of a vacuum pipe turnable with said platform, sets of teat cups and milk conduits therefrom turnable with the platform, valves adapted to connect the respective milk conduits alternately with the vacuum pipe and atmosphere, valves interposed in the milk conduits, and means to pulsate said sets of teat cups, said means including pulsation-controlling devices arranged at spaced intervals along the platform, a relatively fixed actuator adapted, in the rotation of the platform, to successively operate the first named valves to open the connections between the respective milk conduits and the vacuum pipe, a relatively fixed actuator, adapted, in the rotation of the platform, to successively operate the first named valves to open the connections between the respective milk conduit and atmosphere, a relatively fixed actuator adapted, in the rotation of the platform, to successively operate the pulsation controlling devices to pulsate the respective teat cup sets, and a relatively fixed actuator adapted in the rotation of the platform, to successively operate the pulsation-controlling devices to cut off pulsations to the respective teat cup sets.

31. In a cow milking machine, the combination with a rotatable platform adapted to carry cows to be milked while the platform is rotating, of a vacuum pipe turnable with said platform, sets of teat cups and milk conduits connected respectively therewith and turnable with said platform, milk pails connected with the respective milk conduits and turnable with the platform, air conduits between the respective milk pails and the vacuum pipe, valves controlling communication between said vacuum pipe and the respective air conduits, and means to pulsate said sets of teat cups, said means including pulsation-controlling devices arranged at spaced intervals along said platform.

32. In a cow milking machine, the combination with a rotatable platform adapted to carry cows to be milked while the platform is rotating, of a vacuum pipe turnable with said platform, sets of teat cups and milk conduits connected respectively therewith and turnable with the platform, milk pails connected with the respective milk conduits and turnable with the platform, vacuum conduits between the respective milk pails and the vacuum pipe, means to pulsate said sets of teat cups including pulsation controlling devices for the respective sets of teat cups, and valves interposed in the respective milk conduits.

33. In a cow milking machine, the combination with a rotatable platform adapted to carry cows to be milked while the platform is rotating, of a vacuum pipe turnable with said platform, sets of teat cups and milk conduits connected respectively therewith and turnable with the platform, milk pails connected with the respective milk conduits and turnable with the platform, air conduits between the respective milk pails and the vacuum pipe, means to pulsate said sets of teat cups including pulsation-controlling devices for the respective sets of teat cups, valves interposed in the respective milk conduits, and valves controlling the flow of air from the pails through said respective air conduits.

34. In a cow milking machine, the combination with a rotatable platform adapted to carry cows to be milked while the platform is rotating, a milking mechanism, including spaced apart milk pails, carried by and turnable with the platform, a stationary milk-receiving tank, and means operable, as a milk pail passes said tank, to effect the discharge of said milk from said pail to said tank.

35. In a cow milking machine, the combination with a rotatable platform adapted to carry cows to be milked while the platform is rotating, a milking mechanism, including spaced apart milk pails with discharge spouts, carried by and turnable with the platform, a stationary milk-receiving tank, a milk conduit swingable relatively to, and communicating with said tank and in line of travel of the spouts of the pails and engageable and operable by a spout to provide communication between the spout and conduit while the latter is being swung by the spout, and means operable, during said engagement between a spout and said conduit, to effect the discharge of milk from said spout into said conduit.

36. In a cow milking machine, the combination with a rotatable platform adapted to carry cows to be milked while the platform is rotating, of a source of vacuum, milk pails arranged at intervals along the platform, means adapted to connect the respective milk pails with vacuum or atmosphere, said means including valves adapted to connect the respective milk pails with atmosphere, sets of teats cups and milk conduits adapted to connect them with the respective pails, said pails having milk outlets, closures controlling said outlets and adapted to be held closed by a vacuum within the pails, and a relatively fixed actuator adapted, in the rotation of the platform to operate said valves successively and thereby admit air to the pails successively and allow corresponding pail closures to open successively and discharge milk, a stationary milk receiving tank, and a conduit, adapted to receive said discharged milk and carried by and communicating with said tank and engageable by and movable with a milk pail while the latter is discharging milk.

37. In a cow milking machine, the combination with a rotatable platform adapted to carry cows to be milked while the platform is rotating, of a source of vacuum, milk pails arranged at intervals along the platform, means adapted to connect the respective milk pails with vacuum or atmosphere, said means including valves adapted to connect the respective milk pails with atmosphere, sets of teat cups and milk conduits adapted to connect them with the respective pails, said pails having milk outlets, closures controlling said outlets and adapted to be held closed by a vacuum within the pails, and a relatively fixed actuator adapted, in the rotation of the platform, to operate said valves successively and thereby admit air to the pails successively and allow corresponding pail closures to open successively and discharge milk.

38. In a cow milking machine, the combination with a rotatable platform adapted to carry cows to be milked while the platform is rotating, of a vacuum pipe turnable with the platform, milk pails arranged at intervals along the platform, means, including valves, adapted to connect the respective milk pails with the vacuum pipe or atmosphere, sets of teat cups and milk conduits adapted to connect them with the respective pails, said pails having milk outlets, closures controlling said outlets and adapted to be held closed by a vacuum within the pails, and two relatively fixed and widely spaced apart actuators, one adapted in the rotation of the platform to operate said valves to connect the pails successively with vacuum and the other adapted, in the rotation of the platform, to operate said valves to connect the pails successively with atmosphere.

39. In an apparatus of the character described, the combination with a rotatable platform, of a vacuum pipe turnable with the platform, milk pails arranged at intervals along the platform, means, including valves, adapted to connect the respective milk pails with the vacuum pipe or atmosphere, sets of teat cups and milk conduits adapted to connect them with the respective pails, said pails having milk outlets, closures controlling said outlets and adapted to be held closed by a vacuum within the pails, movable hangers on which teat cups are adapted to be hung, a tank adapted to contain a cleaning fluid, and relatively fixed actuators adapted in the rotation of the platform, to respectively operate said valves to connect the respective pails with vacuum and to move said hangers into position to immerse teat cups suspended thereon in said tank thereby causing said cleaning fluid to be drawn through the teat cups and milk conduits into said pails.

40. In an apparatus of the character described, the combination with a rotatable platform, of a vacuum pipe turnable with the platform, milk pails arranged at intervals along the platform, means, including valves, adapted to connect the respective milk pails with the vacuum pipe or atmosphere, sets of teat cups and milk conduits adapted to connect them with the respective pails, said pails having milk outlets, closures controlling said outlets and adapted to be held closed by a vacuum within the pails, movable hangers on which teat cups are adapted to be hung, a tank adapted to contain a cleaning fluid, and relatively fixed actuators adapted in the rotation of the platform, to respectively operate said valves and to connect the respective pails with vacuum and to move said hangers into position to immerse teat cups suspended thereon in said tank thereby causing said cleaning fluid to be drawn through the teat cups and milk conduits into said pails, and other relatively fixed actuators adapted, in the rotation of the platform, to respectively operate said valves to connect the respective pails with atmosphere and to move said hangers into position to withdraw the teat cups suspended thereon from said tank and allow the discharge of cleaning fluid from said pails.

41. In an apparatus of the character described, the combination with a rotatable platform, of sets of teat cups, milk pails and conduits connecting the sets of teat cups with the respective pails, all being turnable with the platform, a vacuum pipe extending around and turnable with said platform, a stationary tank adapted to contain a cleaning fluid, means to operatively connect and disconnect the teat cups and pail with the vacuum pipe, hangers adapted to receive the teat cups, and means to move said hangers to move suspended teat cups into and out of said tank.

42. In a cow milking machine, the combination with a rotatable platform adapted to carry cows to be milked while the platform is rotating, of sets of teat cups, milk pails and conduits connecting the sets of teat cups with the respective pails, all being turnable with the platform, milking mechanism, including a vacuum pipe, extending around and turnable with said platform, a stationary tank adapted to contain a cleaning fluid, devices moving with said milking mechanism and adapted to control operative communication between said milking mechanism and the respective teat cup sets, and relatively fixed actuators adapted, in the rotation of the table, to actuate said devices to open said operative connections prior to milking, a relatively fixed actuator adapted, upon the conclusion of milking, to operate one of said devices to close communication between the vacuum tube and the pails to allow discharge of milk, another relatively fixed actuator adapted to operate the last named device to open communication between the vacuum tube and the pails to allow cleaning fluid to be sucked through the teat cups into the pails, and another relatively fixed actuator adapted to operate the last named device to close communication between the vacuum tube and the pails to allow cleaning fluid to be discharged from the pails.

43. In a cow milking machine, the combination with a rotatable platform adapted to carry cows to be milked while the platform is rotating, of sets of teat cups, milk pails and conduits connecting the sets of teat cups with the respective pails, all being turnable with the platform, milking mechanism, including a vacuum pipe, extending around and turnable with said platform, a stationary tank adapted to contain a cleaning fluid, devices moving with said milking mechanism and adapted to control operative communication between said milking mechanism and the respective teat cup sets, and relatively fixed actuators adapted, in the rotation of the table, to actuate said devices to open said operative connections prior to milking, a relatively fixed actuator adapted, upon the conclusion of milking, to operate one of said devices to close communication between the vacuum tube and the pails, to allow discharge of milk, another relatively fixed actuator adapted to operate the last named device to open communication between the vacuum tube and the pails to allow cleaning fluid to be sucked through the teat cups into the pails, another relatively fixed actuator adapted to operate the last named device to close communication between the vacuum tube and the pails to allow cleaning fluid to be discharged from the pails, hangers adapted to receive the teat cups after the milking operation is completed, and relatively fixed actuators adapted to respectively move said hangers into position to move suspended teat cups into and withdraw them from, said tank.

44. In a machine of the character described, the combination, with a rotatable platform, of sets of teat cups movable with the platform, movable hangers on which said teat cups are adapted to be hung, a tank adapted to contain a cleaning fluid, a relatively fixed actuator adapted, in the rotation of the platform, to successively move said hangers into position to immerse the teat cups suspended thereon in the tank, and means operable in the rotation of the platform, while a set of teat cups is so immersed, to create suction in the teat cups to cause cleaning fluid in the tank to be drawn through the teat cups.

45. In a machine of the character described, the combination, with a rotatable platform, of sets of teat cups movable with the platform, movable hangers on which said teat cups are adapted to be hung, a tank adapted to contain a cleaning fluid, a relatively fixed actuator adapted, in the rotation of the platform, to successively move said hangers into position to immerse the teat cups suspended thereon in the tank, milk pails movable with the platform and tube connections between the pails and the respective sets of teat cups, means operable in the rotation of the platform, while a set of teat cups is so immersed, to establish a partial vacuum in such teat cups and in the corresponding milk pail and tubular connections, means operable in the rotation of the platform to break said vacuum and discharge said cleaning fluid, and another relatively fixed actuator adapted, in the rotation of the platform, to successively move said hangers into position to withdraw the teat cups suspended thereon from said tank.

In testimony of which invention, I have hereunto set my hand, at city of New York, New York, on this 19th day of December, 1927.

CYRUS HOWARD HAPGOOD.